Patented Aug. 19, 1952

2,607,800

UNITED STATES PATENT OFFICE 2,607,800

PREPARATION OF HALOGENATED ESTERS

Erving Arundale, Westfield, N. J., assignor to Standard Oil Development Company, a corporation of Delaware No Drawing. Application December 14, 1949, Serial No. 133,006

4 Claims. (Cl. 260—496)

This invention relates to a novel method for the preparation of halogenated esters from cyclic acetals.

A new method has been found for obtaining halogenated esters in a practical fashion and in good yields by reacting meta dioxanes or dioxolanes with organic acid chlorides in the presence of a relatively small amount of a catalyst selected from the typical esterification type.

A typical reaction of this type is represented by the following equation when employing meta dioxanes as the cyclic acetal.

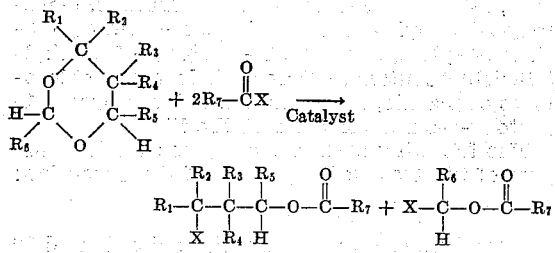

wherein $R_1$, $R_2$, $R_3$, $R_4$, $R_5$ and $R_6$ are hydrogen, halogen, alkyl, aryl, aralkyl, cycloalkyl, alkaryl, haloalkyl or alkoxy alkyl groups, and X is a halogen atom such as a chlorine, bromine, or iodine atom. $R_7$ is an alkyl, aryl, aralkyl, alkaryl or halo alkyl radical.

The halogenated esters so formed may be used as solvents, resin or rubber plasticizers, and chemical intermediates, or they may be subjected to further reaction, such as hydrolysis of the halogen atom, saponification of the ester group, or dehydrohalogenation to yield related products such as unsaturated esters, unsaturated alcohols, chlorohydrins or glycols. In this way, compounds which are otherwise difficult to obtain may be prepared by this novel and useful process.

Thus, according to the present invention, halogenated esters are prepared from cyclic acetals, such as the meta-dioxanes and dioxolanes. The meta-dioxanes are cyclic acetals possessing six-membered rings and having the following general formula:

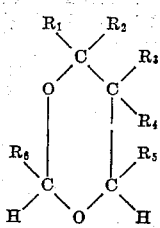

wherein $R_1$, $R_2$, $R_3$, $R_4$, $R_5$, and $R_6$ are hydrogen, alkyl, aryl, cycloalkyl, aralkyl, or alkaryl radicals, or substituted derivatives thereof, such as haloalkyl, alkoxyalkyl radicals, and the like.

These meta-dioxanes may be prepared by any of several well known methods. One especially good method is by the reaction of two moles of an aldehyde with one mole of an organic material containing an olefinic bond in the presence of an acidic catalyst for example:

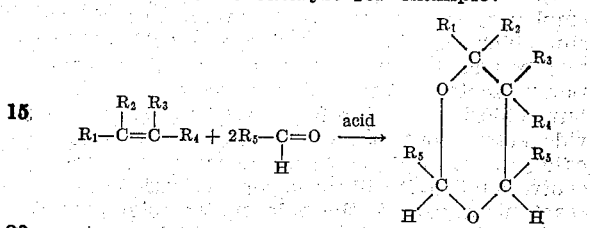

where $R_1$, $R_2$, $R_3$, $R_4$, and $R_5$ have the same meaning as described above. They can also be prepared by the reaction of 1,3 glycols with aldehydes in the presence of an acetalization catalyst such as $H_2SO_4$, toluene sulfonic acid, zinc chloride, HCl and the like. The dioxolanes are prepared from 1,2 glycols in a similar manner.

Examples of the cyclic acetals which can be so prepared and are capable of being converted into halogenated esters by the reaction of the present invention are as follows (the numbering of the atoms composing the meta-dioxane and dioxolane rings is indicated in the following skeleton formula):

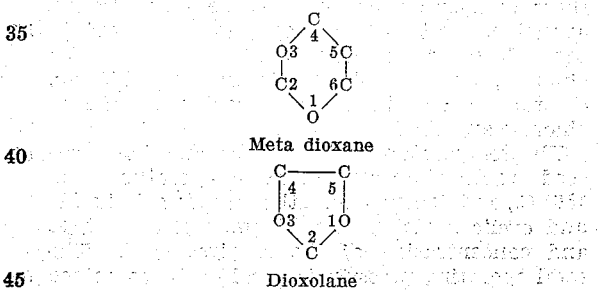

4,4-dimethyl meta-dioxane; 2,4,4,6-tetramethyl meta-dioxane; 4-methyl meta-dioxane; 2,6-diphenyl-4,4-dimethyl meta-dioxane; 4,5-dimethyl meta-dioxane; 4-methyl-4-vinyl meta-dioxane; 4,4,5-trimethyl meta-dioxane; 4-propyl meta-dioxane; 2,4,4,5,6-pentamethyl meta-dioxane; 4-ethyl-5-methyl meta-dioxane; 4,4-dimethyl-5-tert-butyl meta-dioxane; 4-methyl-4-neopentyl meta-dioxane; 4-methyl-4-phenyl meta-dioxane; 4,5-cyclohexo meta-dioxane; 4- methyl-4-ethoxyethyl meta-dioxane; 2-methyl dioxolane; 4,4,5,5 - tetramethyl dioxolane; 4-methyl dioxolane; and 2,4-dimethyl dioxolane. The meta-dioxanes having substituents as the 4 position of the ring are particularly easy to prepare and so are very useful in this process.

Halogenated meta-dioxanes which may be used in the process are 4-chloromethyl meta-dioxane, from allyl chloride and formaldehyde; 4-methyl - 4 - chloromethyl meta-dioxane, from methallyl chloride and formaldehyde; and 4-4-dimethyl-5-chloro meta-dioxane, from isocrotyl chloride and formaldehyde.

The formation of the halogen-substituted esters by reaction of the cyclic acetals with organic acid chlorides is conducted in the presence of a catalyst or mixture of catalysts of the type necessary to effect esterifications. Such catalysts include sulfuric, hydrochloric, phosphoric, chlorsulfonic and other acids or inorganic halides such as boron trifluoride, zinc chloride, stannic chloride, aluminum chloride, ferric chloride, calcium chloride and the like, and of these the inorganic halides are to be preferred. Anhydrous zinc chloride has been found to be especially useful. While a reaction does take place in the presence of inorganic acid catalysts, the yield of desired halogenated ester is usually lower than when inorganic halide catalysts are used.

Mixtures of the above catalysts may also be employed; for example, inorganic salts such as zinc chloride, calcium chloride, zinc sulfate, etc. may be added to mineral acids as auxiliary reaction promoters. A mutual solvent such as carbon tetrachloride or chloroform may be used to provide better contact between the reactants and catalyst. A catalyst of such a nature and concentration that it will cause polymerization of the reactants and/or of the halogenated ester products obtained in this process should be avoided and care should be exercised to choose a catalyst for obtaining optimum results with each particular cyclic acetal. The amount of catalyst employed ranges between 0.05 to 5 weight percent based on the reactants and usually between 0.5 to 2 percent.

The acid halides which may be used to react with the cyclic acetals and which function in the reaction both as esterification and halogenation agents may consist of any acid halide-containing 2-12 carbon atoms, that is, a fluoride, chloride, bromide or iodide, although, generally the use of a chloride or bromide is most practical since these compounds are by far the most readily available, most stable, and most convenient to use. Such organic acid halides include acetyl chloride, butyryl chloride, iso-caproyl chloride, chloracetyl chloride, benzoyl chloride, lauroyl chloride and the like.

The temperature at which the reactions proceed varies between room temperature and 150° C., and depends upon the organic acid halide and cyclic acetal employed and upon the type and concentration of the catalyst used. The total operating pressure is equal to the combined vapor pressures of the reactants, solvent, and catalyst at the temperature of the reaction. However, the reaction pressure may vary between one and several atmospheres. The time range within which the reaction is completed generally extends from 0.1 to 16 hours.

The process of the present invention may be carried out in either a batch or continuous fashion and in either the liquid or vapor phase. It is preferred, however, to add the cyclic acetal slowly to a stirred and heated mixture of organic acid chloride and catalyst. The reaction in most cases is exothermic so that subsequent cooling may be necessary in order to maintain the desired reaction temperature. The product can be washed with water to remove catalyst, neutralized with a weak alkali to remove acid, dried to remove water, and subsequently vacuum distilled.

Cyclic acetals suitable as starting materials for this process may be prepared by the condensation of olefins, or other unsaturated compounds, with aldehydes in the presence of mineral acids. It is not necessary to isolate the meta-dioxanes; instead any water is removed and the olefin-aldehyde reaction mixtures containing the cyclic acetals reacted directly with the organic acid halides to produce the halogenated esters therefrom.

In order to obtain maximum yields of the preferred halogenated esters, it is desirable to use between one or two moles of organic acid halide for each mole of cyclic acetal. If two moles of acid halide are employed, there will be produced two distinct halogenated ester products whose general structures are shown above. Obviously the two esters will be formed in equal proportions and will be produced in direct amounts to the amount of cyclic acetal decomposed.

Halogenated esters which can be produced by the process of this invention include 1-acetoxy-3-chlorobutane, 1 - acetoxy - 3-chloro-3-methylbutane, 1-benzoxy-3-chloro-3-methylbutane, 1-acetoxy-2-methyl-3-chloropentane, 1 - acetoxy - 3-chloro-3-phenylpropane, 1 - acetoxy - 3-methyl-3,4-dichlorobutane, chloromethylacetate, chloromethylbenzoate, 1 - acetoxy-2-chloropropane, 1-acetoxy-2-chloroethane and the like.

The following examples are given for the purpose of illustrating the process of this invention:

*Example I*

A mixture of 4 moles of acetyl chloride and 10 grams of anhydrous zinc chloride was stirred and heated at 50–55° C. (reflux temperature) while there are added 2 moles of 4,4-dimethyl meta-dioxane over a period of 4½ hours. The reaction was exothermic. At the end of 4½ hours water was added and the reaction mixture washed with a 5% potassium carbonate solution. There appeared to be very little acidity present in the aqueous layer indicating substantially complete reaction of the acetyl chloride with the meta-dioxane. After drying over anhydrous calcium sulfate, the product was filtered and distilled under vacuum and two products isolated. There are no appreciable amounts of side products. One product boiled at 33.5–39° C. at 5 mm. and analyzed as follows:

|  | Found | Theoretical for $C_3H_5O_2Cl$ |
|---|---|---|
| Percent Carbon | 40.33 | 33.2 |
| Percent Hydrogen | 6.89 | 4.6 |
| Percent Chlorine | 31.0 | 32.7 |

This is impure chloromethyl acetate. The second product boils at 46.7–50° C. at 4 mm. and gave the following analysis:

|  | Found | Theoretical for $C_7H_{13}O_2Cl$ |
|---|---|---|
| Percent Carbon | 53.16 | 51.0 |
| Percent Hydrogen | 9.69 | 7.95 |
| Percent Chlorine | 21.9 | 21.55 |

The analysis indicated this product to be a chloroamyl acetate of the structure expected, (1-acetoxy-3-methyl-3-chlorobutane).

Both products were obtained in substantially quantitative yield.

*Example II*

A mixture of 2 moles of isocaproyl chloride and 10 grams of anhydrous zinc chloride was mixed and heated to 70° C. One mole of 4-ethyl-5-methyl meta-dioxane (from pentene-2 and formaldehyde) was then added slowly (with stirring) over a period of 1¾ hours, the temperature being maintained between 77–83° C. After the addition of the meta-dioxane was complete, the reaction period was continued for an additional 15 minutes. The resulting reaction mixture was then cooled to 50° C. and water was added slowly. The mixture was stirred briefly and cooled to room temperature. The organic product was washed with a 5% sodium carbonate solution, ether was added, and the ether extract was washed with water. The ether extract was dried over an anhydrous calcium chloride-sodium sulfate mixture. The dried solution was filtered, the ether removed, and the residue subjected to vacuum distillation. The chloro-hexyl isocaproate product boiled between 76 and 90° C. at 7 m. m. The crude chloroester product analyzed as follows:

|  | Found | Theoretical for $C_{12}H_{23}O_2Cl$ |
|---|---|---|
| Percent Carbon | 60.4 | 61.3 |
| Percent Hydrogen | 10.3 | 9.9 |
| Percent Chlorine | 13.0 | 15.1 |

The ester structure can be formulated as follows:

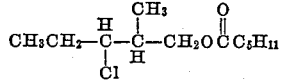

Some higher boiling material was also obtained.

What is claimed is:

1. A process for the preparation of organic chloroesters which comprises reacting 1 mole of meta-dioxane having at least one alkyl substituent at the 4 position of the ring with two moles of an organic acid chloride in the presence of an organic metal catalyst, said alkyl substituent having 1 to 5 carbon atoms, and recovering two chloroester products, one of which has chlorine attached to the third carbon atom of an alkyl radical joined by its first carbon atom to oxygen of an ester group.

2. A process for the preparation of organic chloroesters which comprises reacting 1 mole of a meta-dioxane having at least one alkyl substituent in the 4 position of the ring with two moles of an organic acid chloride in the presence of zinc chloride as a catalyst at temperatures below 150° C., said alkyl substituent having 1 to 5 carbon atoms, and recovering two chloroester products, one of which has chlorine attached to the third carbon atom of an alkyl radical joined at its first carbon atom to oxygen of an ester group and the other being a chloro methyl ester of the organic radical in said organic acid chloride.

3. A process for the preparation of a chloroamyl acetate and chloro-methyl acetate which comprises reacting one mole of 4,4-dimethyl meta-dioxane with two moles of acetyl chloride at 50°–55° C. in the presence of zinc chloride as a catalyst.

4. A process for the preparation of chlorohexyl isocaproate which comprises reacting one mole of 4-ethyl-5-methyl meta dioxane with two moles of isocaproyl chloride at approximately 80° C., in the presence of zinc chloride as a catalyst.

ERVING ARUNDALE.

REFERENCES CITED

The following references are of record in the file of this patent:

UNITED STATES PATENTS

| Number | Name | Date |
|---|---|---|
| 2,314,454 | Manchen et al. | Mar. 23, 1943 |
| 2,377,878 | Gresham | June 12, 1945 |